United States Patent
Perdicaro et al.

(10) Patent No.: US 11,034,163 B2
(45) Date of Patent: Jun. 15, 2021

(54) TWO-SIDED MULTI-LANE PRINT FOR INDEPENDENT PRINT STREAMS

(71) Applicant: HEWLETT-PACKARD DEVELOPMENT COMPANY, L.P., Spring, TX (US)

(72) Inventors: Frank Perdicaro, Corvallis, OR (US); David C. Collins, Corvallis, OR (US); Bruce A. Stephens, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/605,839

(22) PCT Filed: Apr. 5, 2018

(86) PCT No.: PCT/US2018/026226
§ 371 (c)(1),
(2) Date: Oct. 17, 2019

(87) PCT Pub. No.: WO2019/194809
PCT Pub. Date: Oct. 10, 2019

(65) Prior Publication Data
US 2021/0122170 A1    Apr. 29, 2021

(51) Int. Cl.
*B41J 3/60*     (2006.01)
*B41J 11/42*    (2006.01)
*G06K 15/02*    (2006.01)

(52) U.S. Cl.
CPC .............. *B41J 3/60* (2013.01); *B41J 11/42* (2013.01); *G06K 15/022* (2013.01); *G06K 15/025* (2013.01); *G06K 15/1842* (2013.01)

(58) Field of Classification Search
CPC ........... B41J 3/60; B41J 11/42; G06K 15/025; G06K 15/022; G06K 15/1842
See application file for complete search history.

(56) References Cited

U.S. PATENT DOCUMENTS

| | | | |
|---|---|---|---|
| 5,179,417 A  * | 1/1993 | Sugaya | B41J 3/60 355/24 |
| 8,274,691 B1 | 9/2012 | Delfer | |
| 8,693,059 B2 | 4/2014 | Boyes et al. | |
| 9,760,328 B2 | 9/2017 | Mastie et al. | |
| 2004/0046971 A1* | 3/2004 | Lapstun | B41J 29/38 358/1.1 |
| 2005/0028701 A1* | 2/2005 | Scheffer | B65H 23/1886 101/485 |

(Continued)

*Primary Examiner* — Ted W Barnes
(74) *Attorney, Agent, or Firm* — Fabian VanCott (57) ABSTRACT

A printing device may include a processor to receive data describing a plurality of independent print streams comprising an image; for each of the plurality of independent print streams, emulate a first frame-less press using gapless frames on a first side of a medium upon execution of a framing module wherein each of the images of the independent print streams comprise an emulated spitgap; for each of the plurality of independent print streams, emulating a second frame-less press using gapless frames on a second side of the medium with the framing module, wherein an emulated spitgap associated with each of the images of the second side of the medium is to be geometrically adjusted to match a position on the medium of an image on the first side of the medium.

15 Claims, 5 Drawing Sheets

(56) References Cited

U.S. PATENT DOCUMENTS

| | | | |
|---|---|---|---|
| 2005/0199151 A1* | 9/2005 | Holten | B41F 33/0045 101/484 |
| 2009/0293750 A1* | 12/2009 | Haenni | B41J 3/60 101/484 |
| 2010/0140339 A1* | 6/2010 | Byerly | B41J 3/407 235/3 |
| 2010/0245912 A1 | 9/2010 | Mount et al. | |
| 2010/0247218 A1* | 9/2010 | Sakamoto | B41J 3/60 400/583 |
| 2010/0329756 A1* | 12/2010 | Mizes | G03G 15/6517 399/364 |
| 2011/0227981 A1 | 9/2011 | Lapstun et al. | |
| 2012/0020689 A1* | 1/2012 | Inoue | G03G 15/6517 399/68 |
| 2013/0050314 A1* | 2/2013 | Duke | B41J 3/60 347/9 |
| 2013/0050320 A1* | 2/2013 | Duke | B41J 3/60 347/14 |
| 2013/0104760 A1* | 5/2013 | Malik | B41F 13/025 101/228 |
| 2016/0167361 A1* | 6/2016 | Fernandez Espasa | B41J 2/2135 101/481 |
| 2016/0279978 A1* | 9/2016 | Stephens | B41J 3/60 |
| 2016/0307076 A1 | 10/2016 | Muthupandi et al. | |
| 2017/0291435 A1* | 10/2017 | Millan-Lorman | B41J 11/46 |
| 2018/0272694 A1* | 9/2018 | Gohda | B41J 11/42 |

* cited by examiner

TWO-SIDED MULTI-LANE PRINT FOR INDEPENDENT PRINT STREAMS

BACKGROUND

Printing systems, such as two-dimensional (2D) and three-dimensional (3D) printing systems, deposit markings or other agents onto a medium such as paper, cardboard, a print bed, or similar surfaces. In some examples, the dimensions of the images to be printed may be smaller than the dimensions of the medium. As such, the medium may be cut after the images have been formed thereon to create individual printed units such as sheets of paper, boxes, among other printed units. The printing system may print large numbers of these units quickly and with a certain level of quality.

BRIEF DESCRIPTION OF THE DRAWINGS

The accompanying drawings illustrate various examples of the principles described herein and are part of the specification. The illustrated examples are given merely for illustration, and do not limit the scope of the claims.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Printing technology includes a variety of printing devices used to transfer an amount of printing fluid to the surface of a medium. Web-presses are included among these printing devices. Web-presses implement a continuous sheet of medium called a "web" having a specified continuous width but with a relatively larger length. In the context of the present application, a "width" of the web is meant to be understood as a measurement of the web perpendicular to the direction the web enters the web-press. This measurement may be expressed by a number of pixels. Similarly, a "length" of the web is meant to be understood as a measurement of the web parallel to the direction the web enters the web-press. This measurement may be expressed by a number of pixels. The length of the web may be vastly longer than the width of the web. As used in the present specification and in the appended the term "medium" is meant to be understood as any surface onto which a printing fluid may be disposed and may include a web. In the context of the present description, however, the term "web" may be used interchangeably with the term "medium."

In order to save costs and continually run the web-press, an operator may try to waste as little of the medium as possible. In order to accomplish this, the operator may cause as many images as possible to be printed across a width of the medium as possible or between a first and subsequent printed images. As used in the present specification and in the appended claims, the term "across" is meant to be understood as a direction perpendicular to the direction the medium enters into and move through the printing device.

In some examples, an operator may cause a plurality of images having different widths to be printed on the medium. In this example, the total sum of the widths of each of these different images may be equal to or less than the total width of the medium. As used in the present specification and in the appended claims, the term "image width" or similar language is meant to be understood as a dimension of any image parallel to the direction across the medium. As such, an operator may increase the number of images across the medium until the amount of medium not to be printed on is minimized. This has been referred to as multi-lane print architecture (MLPA) that allows even a plurality of different print jobs to be printed at the same time on the same roll of medium. The individual images may be repeated along the medium as the medium enters the printing device. This may form "print streams" of images along the length of the medium. As used in the present specification and in the appended claims, the term or "print stream" is meant to be understood as a digital version of images that, when printed onto a medium, form an elongated strip of images on a medium repeated end-to-end along the length of the medium. In an example, each print stream may have a width of an image. In an example, any number of print streams may be formed onto either side of the medium. Consequently, although certain examples show that one or two print streams are formed on either side of the medium, the present specification contemplates more than two print streams.

During printing of these print streams, however, the length of each of the different images is different. However, with the various types of printing devices described herein, some of the length of the images printed may be more or less than the length of a physical frame and/or digital frame. The physical "frame" is defined as a length equal to the circumference of a transfer roller, drum, and/or belt used to transfer an amount of printing fluid to the medium. Because the circumference of this transfer roller (or, in some examples, a photo drum or belt) is set, a frame length along the length of the medium is also set. In some example, therefore, the length of an image may be more or less than the length of the frame. Consequently, in MLPA the transfer roller may receive any portion of any number of images to transfer to the media when the images to be printed are either longer or shorter than the length of the frame. In other examples, the printing device may cause an amount of printing fluid to be dispensed onto the surface of the medium via a number of printing fluid ejection devices. In this example, a physical drum, transfer roller, and/or belt is not used. Instead, the term "frame" in this example, may include a digital frame that is developed within a digital space and stored on a memory buffer to be used to provide information to the printing device as to when and where to deposit the printing fluid onto the medium. Thus, the present specification contemplates the implementation of the method and computer program product described herein in connection with any type of printing device.

However, the above-described MLPA printing system and method is operated in simplex and not duplex. The present specification instead describes a duplex MLPA printing process and device. With the duplex MLPA printing process, an emulated image size within any number of emulated frames may be used on a first side of the medium while an emulated image size may be used on a second side of the medium so as to adjust for shrinkage and/or stretching of the medium during the printing process. Although the actual frame size on which an image may be printed is set as a result of the physical parameters of the printing device or digitally as described herein, an emulated spitgap may be associated with each image printed on, at least, the second side of the medium within any given emulated frame. Consequently, the length of the image to be printed may include, in an example, the length of the image plus one of a number of lengths of a spitgap and may be placed digitally within an emulated frame prior to being printed.

In the context of a web-press, the print streams printed on a first side of the web may include an emulated spitgap and the print streams printed on the second side of the web may include an adjustable or adjusted emulated spitgap. In the example of a non-web press type printing device, the print streams printed on a first side of the medium may include the digitally created emulated spitgap and the print streams printed on the second side of the medium may include an adjustable or adjusted and digitally created emulated spitgap. In the context of the present application, an emulated spitgap includes a space provided between each printed image in a print stream that may be adjusted so that images on a second side of the web may be positioned on an opposite side of the images printed on the first side of the web. After this duplex MLPA printing process, any emulated spitgaps may be cut from the printed units as waste and disposed of.

The present specification describes printing device may include a processor to receive data describing a plurality of independent print streams comprising an image; for each of the plurality of independent print streams, emulate a first frame-less press using gapless frames on a first side of a medium upon execution of a framing module wherein each of the images of the independent print streams comprise an emulated spitgap; for each of the plurality of independent print streams, emulating a second frame-less press using gapless frames on a second side of the medium with the framing module, wherein an emulated spitgap associated with each of the images of the second side of the medium is to be geometrically adjusted to match a position on the medium of an image on the first side of the medium.

The present specification further describes a method that includes, with a processor; receiving data describing a plurality of independent print streams comprising an image; for each of the plurality of independent print streams, emulating a first frame-less press using gapless frames on a first side of a medium wherein each of the images of the independent print streams comprise an emulated spitgap; for each of the plurality of independent print streams, emulating a second frame-less press using gapless frames on a second side of the medium, wherein an emulated spitgap associated with each of the images on the second side of the medium is to be geometrically adjusted to match a position on the medium of an image on the first side of the medium; wherein the geometrical adjustment provided by the emulated spitgap for the second frameless press compensates for a distortion of the size of the medium.

The present specification further describes computer program product for duplex multi-lane printing, the computer program product that includes a computer readable storage medium comprising computer usable program code embodied therewith, the computer usable program code to, when executed by a processor: receive data describing a plurality of independent print streams comprising an image; for each of the plurality of independent print streams; emulating a first frame-less press using gapless frames on a first side of a medium with each of the plurality of images of the independent print streams comprising an emulated spitgap; for each of the plurality of independent print streams, emulating a second frame-less press using gapless frames on a second side of the medium, wherein an emulated spitgap associated with each of the images of the second side of the medium is to be geometrically adjusted to match a position on the medium of an image on the first side of the medium.

Figure 1:
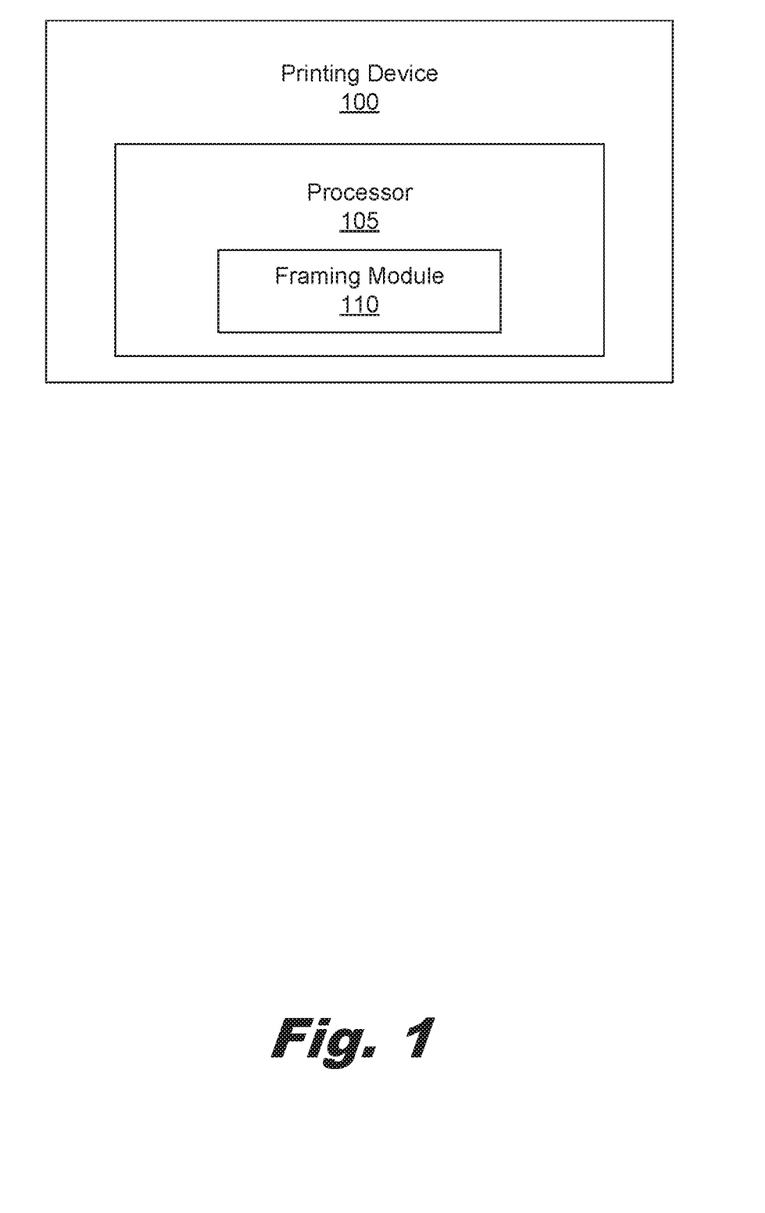
FIG. 1 is a block diagram of a printing device according to an example of the principles described herein.

Turning now to the figures, FIG. 1 is a block diagram of a printing device (100) according to an example of the principles described herein. The printing device (100) may include a processor (105) to execute computer usable program code such as a framing module (110). In an example; the processor (105) may be a raster-image processor (RIP) used to receive image data and rasterize that image data in order to determine how and where to apply a printing fluid to the surface of the medium.

During operation, the processor (105) may receive data describing a plurality of geometrically independent images. In the present specification and in the appended claims the term "geometrically independent" is meant to be understood as geometric characteristics of an image that are not dependent on geometric characteristics of a different image. In an example, the plurality of geometrically independent images each have a length, width, or combination of a length and width that are different from each other. In this example, the width of the print streams created by the plurality of geometrically independent images may be different. Additionally, in this example, the length of the plurality of geometrically independent image may be different such that, as the print streams are printed, at least one of the plurality of geometrically independent images include more or less units on that print stream than other geometrically independent images printed in different print streams.

The plurality of geometrically independent images may each include, as part of the emulated frame, an emulated spitgap. During the printing process, a spitgap may be used for inkjet-type printing devices in order to determine the functioning of the devices used to eject fluid onto the paper. This may be done by ejecting an amount of printing fluid onto these spitgaps. The amount of paper used as the spitgap may be cut off from the printed unit and thrown away. In this example with inkjet printing devices as well as with other types of devices, the portion cut off may be referred to as a "chipout." In the example where the printing device is a web-press, such spitgaps are not used to eject printing fluid therein because the associated fluid ejection devices are not implemented. Instead, with a web-press uses a drum having a circumference to receive and transfer an image to the web. As a result, a "frame" of the web-press has a web length equal to the circumference of this drum. In other examples such as a printing device without a transfer roller implemented, the term "frame" may be a digitally developed space within a memory buffer. In this example, whatever has been generated in the memory buffer is presented on the paper via ejection of a printing fluid to the surface of the medium. However, an emulated spitgap may be used as described herein in connection with web-press type printing devices. Thus, the present specification contemplates the implementation of the method and computer program product described herein in connection with any type of printing device.

With duplex printing, as a result of shrinkage and/or expansion of the medium after application of a number of images on the first side of the medium, any images formed on the second side of the medium may not match up with images formed on the first side. As used in the present specification and in the appended claims, the term "spitgap" is meant to be understood as an emulation of space formed between any two sides of any two images printed on the medium. In context of the present application, the emulated spitgap may be formed immediately after an image to be printed on the medium and/or before a subsequent image in the same print stream on the medium. In some examples, the emulated spitgap, when printed, may appear as a blank portion on the web. In some examples where the printing device (100) is an inkjet type printing device, the spitgap may be used to eject an amount of printing fluid thereon in order to confirm and/or maintain the functioning of the individual fluid ejection devices.

The medium used in this duplex MLPA printing process completed by the printing device (100) is to be printed on both sides of the medium. In order to print on both sides of the medium, the printing device (100) may include two print engines that include any devices used to transfer a printing fluid to a surface of the medium. In an example, the first print engine may print on a first side of the medium and the second print engine prints on a second side of the medium. The printing device (100), in an example, may further include a turning device to turn the medium from one side to the other in between the two print engines. The turning device may include a number of rollers to accomplish the turning of the medium from a first side to a second side for consumption by a second print engine of the printing device.

As described, the first side of the medium may receive a first et of images. In an example, these images may or may not be geometrically independent with respect to the other images. These images each include in the frame an emulated spitgap to separate a first printed image in a print stream of images from a subsequent printed image, During operation, the processor (105) may create a number of emulated frames on the first side of the medium onto which images may be placed. In an example, the length of the emulated frame may be determined by taking the larger of the lengths of any of the images to for the print streams plus the longest of any spitgap to be used. For each of the plurality of independent print streams, the processor (105) may emulate a first frame-less press using gapless frames on the first side of the medium. This may be done via execution of the framing module (110). This emulation allows at least the first print engine of the printing device (100) to create a set of images on the first side of the medium with the spitgaps described herein.

The second side of the medium, however, will also have an image applied to it. In this example, a second plurality of independent print streams related to those formed on the first side may be applied. It is understood, however, that in post printing processes, the backside images (image printed on the second side of the medium) appear on an opposite side of the printed media to the frontside images (those images printed on the first side of the medium). As a result, the print streams printed on the first side of the medium are related to the print streams printed on the second side. Additionally, the arrangement of the print streams on the second side may be adjusted to allow for post printing processes to separate the different print jobs represented by the print streams. By way of example, where image "A" and image "B" are printed on the first side of the medium and image "A" represents a page of a book, a print job related to another page of the book may be printed opposite of the print stream image "A" is printed so that the two pages of the book are cut from the print stream after printing. Thus, although the images printed on either side of the medium are different print jobs, those images printed on opposite sides of the medium are related to each other as forming part of a printed unit such as two pages of a book, and opposite sides of a printed package, among other types of printed units.

After the printing fluid has been applied to the first side of the medium, physical changes have occurred to the medium. For example, as the medium is exposed to water-based printing fluid, the medium expands. This phenomenon may be the result of a number of factors including the fiber content of the medium, the composition of the medium, the amount of printing fluid applied to the medium, the speed the images are printed at, mechanical specifications of the printing device (100), the temperature of the medium before and after application of the printing fluid, and the amount of heating applied to the medium after printing, among other factors. When the medium is dried after application of the printing fluid by the first print engine, the medium may then shrink. The exact degree of this expansion and shrinkage cannot be determined based on the factors described above. As a result of the expansion and shrinkage of the medium and the inability to determine to what degree the expansion and/or shrinkage has occurred, the printing device (100) may not be able to determine an exactly or near exactly opposite side of any given image on the first side of the medium. Consequently, duplex printing cannot occur without real-time adjustments to the position of the images printed on the second side of the medium.

Although, the present application may describe that any one of the streams may be a duplex printed print job, the present specification contemplates that any of the plurality of print streams may be simplex as well. By way of example, the first side of the medium may include a plurality of print streams. In some examples, these print streams may be duplexed by having the printing device print an image on the second side of the medium as well. However, in some examples, in connection with some print streams on the first side of the medium, no image is printed on the second side of the medium for certain print streams creating print streams that are both simplex and duplex on a single medium. This mixture of simplex and duplex print streams on a single medium may be completed by a duplex printing device.

To accomplish this, the first print engine of the printing device (100) may add to predetermined positions of the medium a number of marks to indicate a position of the images printed. These marks may be detected by the second print engine of the printing device (100) and may be used to adjust the placement of the images on the second side of the medium. Because the expansion and shrinkage effects these marks to the same or similar degree as the images, the second print engine of the printing device (100) may be able to print the images at an appropriate location. The marks may include any detectable mark that is detectable by a sensor located upstream of a printing fluid applicator of the second print engine. In an example, the marks include a top of form mark. In an example, the marks may appear at the top, at the bottom, and/or at a midpoint location along the printed images.

As the second print engine detects these marks, the sensor or another feedback mechanism may measure any error between the digitally stitched image in each print stream and the detected distance between the marks printed on the first side of the medium. This error may be an accumulation of errors or, in the case of the first and subsequent images of any print stream printed on the first side of the medium, a change in physical distance between the marks before entering the printing device (100) and before entering the second print engine of the printing device (100). Thus, for each of the plurality of independent print streams, the processor (105) of the printing device (100) may emulate a second frame-less press using gapless frames on a second side of the medium with the framing module. In this example, the emulated spitgap associated with each of the images may be geometrically adjusted to match a position on the medium of an image on the first side of the medium.

Because each of the images printed on the first side of the medium included an emulated spitgap, a length of that spitgap may be used, in real time, to adjust the length of the emulated spitgap of the images printed on the second side of the medium. The processor (105) of the printing device (100) may be used here to, in real-time, adjust the length of these emulated spitgaps on the second side continuously per the feedback received. Thus, upon execution of the processor (105), the processor (105) may produce blank emulated frames on the second side of the medium onto which images are to be applied. The images may then be placed digitally on the emulated frames along with a number of emulated spitgaps that have a variable length. The processor (105) may then stitch the individual pages including one of the variable lengths of the emulated spitgaps plus the images to be printed and then place those on emulated frames. While the processor (105) produces the emulated spitgaps, it also chooses which emulated spitgaps to print subsequent to any printed image so as to drive any accumulated error between positions of opposing sided images toward zero. This process may be repeated continuously along the entire length of the medium until the print job is completed. Because the processor (105) is not provided with the information regarding the physical changes in length of the medium in advance to initiating a printing process at the second print engines, the processor (105) may be provided with a plurality of generated emulated variable spitgaps that may be used to drive the accumulated error to zero on a continuous basis. These generated emulated variable spitgaps may each include the original length of the image plus some variable length of an emulated spitgap. As a result, some generated second-side emulated spitgaps may be slightly shorter and some generated second-side emulated spitgaps may be slightly longer than each other. The processor (105) of the printing device (100), during operation, selects in real-time which of these generated second-side emulated spitgaps to use to print the images at the appropriate location on the second side of the medium.

The generated second-side emulated spitgaps of variable sizes may be produced using any of a number of processes. In an example, features of compressed file formats that provide random access of regular areas and tessellation (e.g., Indigo Compressed Format (ICF), tiled tagged image file format (TIFF), and portable network graphics (PNG)) may be exploited to facilitate multiple entry points for the data where there is a single digital copy of the rasterized image of the data. In this example, a plurality of methods may be used to address the image data and create the second-side emulated spitgaps of variable sizes.

In an example, after the processor (105) or another raster-image processor has converted the rasterized data into a compressed file format (i.e., Indigo Compressed Format (ICF)), the data defined in the compressed file format may be amended to include a number of different lengths of spitgaps as described herein. In this example, multiple versions of the generated second-side emulated spitgaps may be created and stored for real-time use by the processor (105) in a data storage device. These may be used during a printing operation of the second print engine.

In an example, an existing multi-lane print architecture (MLPA) stitcher used to stitch the images in the print streams may be modified to produce the generated second-side emulated spitgaps as described herein. In an example, the adjustment of the data of the compressed file formats may be completed using executable program code to process data streams via a field programmable gate array (FPGA).

As described, therefor, the printing device (100) may extend the concepts of MLPA printing processes by having independent print streams on the first side of the medium being modified to have static sized emulated spitgaps among the frames. The second side of the medium includes similar emulated spitgaps but of varying sizes so as to align with the printed content on the first side based on marks printed on the first side. The variation in the emulated spitgaps of the second side images may be calculated in advance to initiating the second side print job. In this example, the printing device (100) may select from a number of varied sizes of emulated spitgaps to form the emulated spitgaps related to each image. In an example, the processor (105) may select the appropriately sized emulated spitgap and send that information to the second print engine, or the second print engine may be able to execute the determination of what size of emulated spitgap to use while processing the compressed file formats defining the varied sizes of spitgaps and their associated image data.

Figure 2:
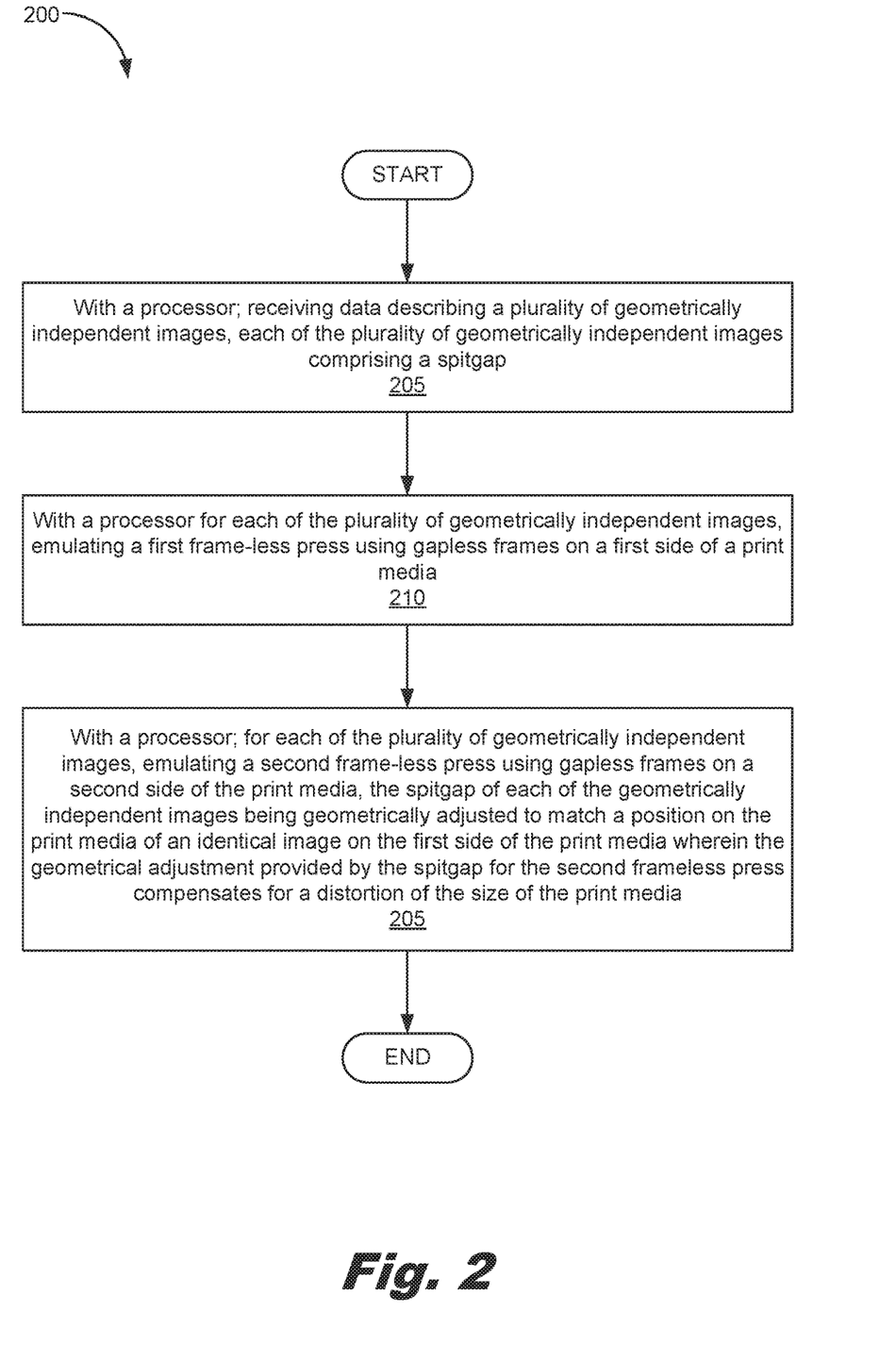
FIG. 2 is a flowchart depicting a method according to an example of the principles described herein.

FIG. 2 is a flowchart depicting a method (200) according to an example of the principles described herein. The method (200) may begin with, at a processor (FIG. 1, 105), receiving (205) data describing a plurality of independent print streams including images, each of the images comprising an emulated spitgap. As described herein, this image data and the length of the emulated spitgap may form a frame to be printed on a first side of a medium.

The method (200) may continue with emulating (210) a first frame-less press using gapless frames on a first side of a medium for each of the plurality of independent print streams. As described above, the emulated spitgaps may form part of each of the emulated frames on the first side of the medium such that where an emulated spitgap ends, a new frame begins with as subsequent image for that print stream being printed followed by its emulated spitgap. This process may continue along the length of the medium forming a print stream for each of the independently print streams.

The method (200) may continue with emulating (215) a second frame-less press using gapless frames on a second side of the medium, the emulated spitgap of each of the images for each independent print streams being geometrically adjusted to match a position on the medium of an image on the first side of the medium for each of the plurality of the print streams. This may be done such that the geometrical adjustment provided by the emulated spitgap for the second frameless press compensates for a distortion of the size of the medium.

The distortion of the size of medium may be based on a number of top-of-form marks printed on the medium that indicate a position of each of the gapless frames printed on the first side of the medium. These top-of form marks may be scanned in order to determine a starting position of the gapless frames on the first side of the medium. The emulated spitgap associated with each of the images of the second side of the medium are adjusted based on these top-of-form marks.

Figure 3:
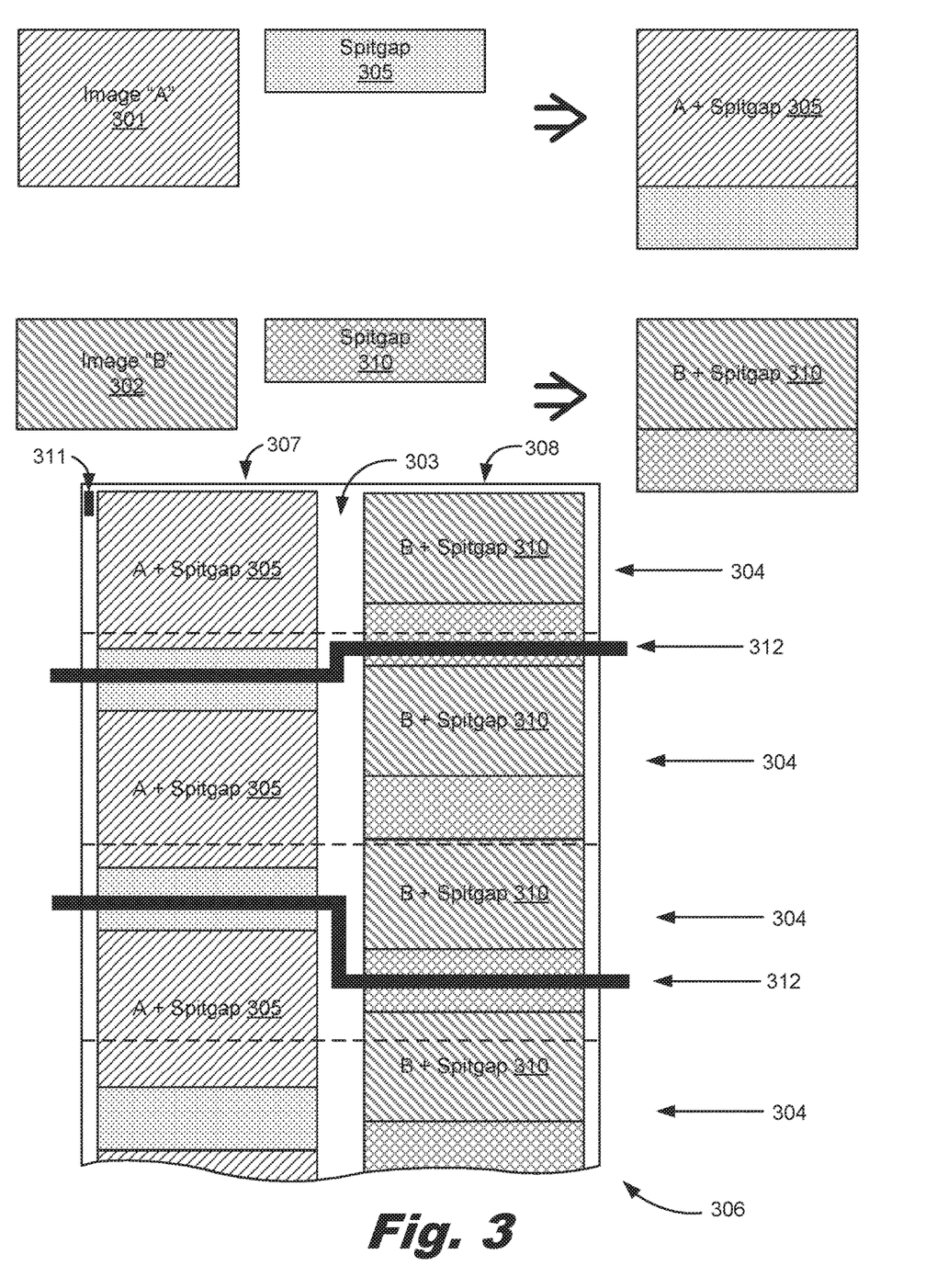
FIG. 3 is a block diagram showing a print layout on a first side of a medium according to an example of the principles described herein.

FIG. 3 is a block diagram showing a print layout on a first side (303) of a medium (306) according to an example of the principles described herein. As described herein, the first side (303) of the medium (306) may receive a number of geometrically independent images (301, 302). A first plurality of geometrically independent images, in this example, is referred to as Image "A" (301) and a second independent image, in this example, is referred to as Image "B" (302).

FIG. 3 shows that Image "A" (301) is combined with a first emulated spitgap (305). The processor (FIG. 1, 105) of the printing device (FIG. 1, 100) may combine this data such that it may determine the pixel length and pixel width of the combined Image "A" (301) and first emulated spitgap (305). The processor (FIG. 1, 105) may then digitally arrange the combined Image "A" (301) and first emulated spitgap (305) within a gapless frame (304) on the medium (306). In the examples shown in FIGS. 3 and 4, a frame (304) includes the space between dashed lines as indicated.

FIG. 3 also shows that Image "B" (302) is combined with a second emulated spitgap (310). The processor (FIG. 1, 105) of the printing device (FIG. 1, 100) may combine this data such that it may determine the pixel length and pixel width of the combined Image "B" (302) and second emulated spitgap (310). The processor (FIG. 1, 105) may then digitally arrange the combined Image "B" (302) and the second emulated spitgap (310) within a gapless frame (304) on the medium (306).

In an example, the first emulated spitgap (305) and the second emulated spitgap (310) are of equal pixel length and pixel width. As can be seen in FIG. 3, after each of Image "A" (301) and Image "B" (302) there exists an area; the first emulated spitgap (305) and the second emulated spitgap (310) that each may be used by the processor (FIG. 1, 105) to adjust the position of any images placed on a second side of the medium (306). In an example, the images to be printed on the second side of the medium (306) are related to Image "A" (301) and Image "B" (302) respectively. This is because the print streams (307, 308) are to be cut from each of the other print streams (307, 308) in post-printing operations.

As described herein, the first side (303) may further include a mark (311). The mark may indicate to a sensor a position of the Image "A" (301), Image "B" (302), or both Image "A" (301) and Image "B" (302). Although FIG. 3 shows a single mark, any number of marks may be used along the length of the medium (306) to indicate to the sensor a position of any image on the first side (303) or on a second side of the medium (306). With this positional information, a second print engine of the printing device (FIG. 1, 100) may determine an expansion or shrinkage of the medium (306) after a printing fluid has been applied to the first side (303) of the medium (306) by a first print engine of the printing device (FIG. 1, 100). As described herein, this positional information provided by the sensor may be used to determine which, of a plurality of emulated spitgaps are to be used during the printing of the subsequent images printed on the second side of the medium (306).

As a result of the arrangement of Image "A" (301) and Image "B" (302) in the first side (303) of the medium (306), an area (312) of adjustment is available between any of the images (301, 302) within a frame (304). This area (312) of adjustment is available for use during the printing of Image "C" (401) and Image "0" (402) on the second side (403) of the medium (306).

Figure 4:
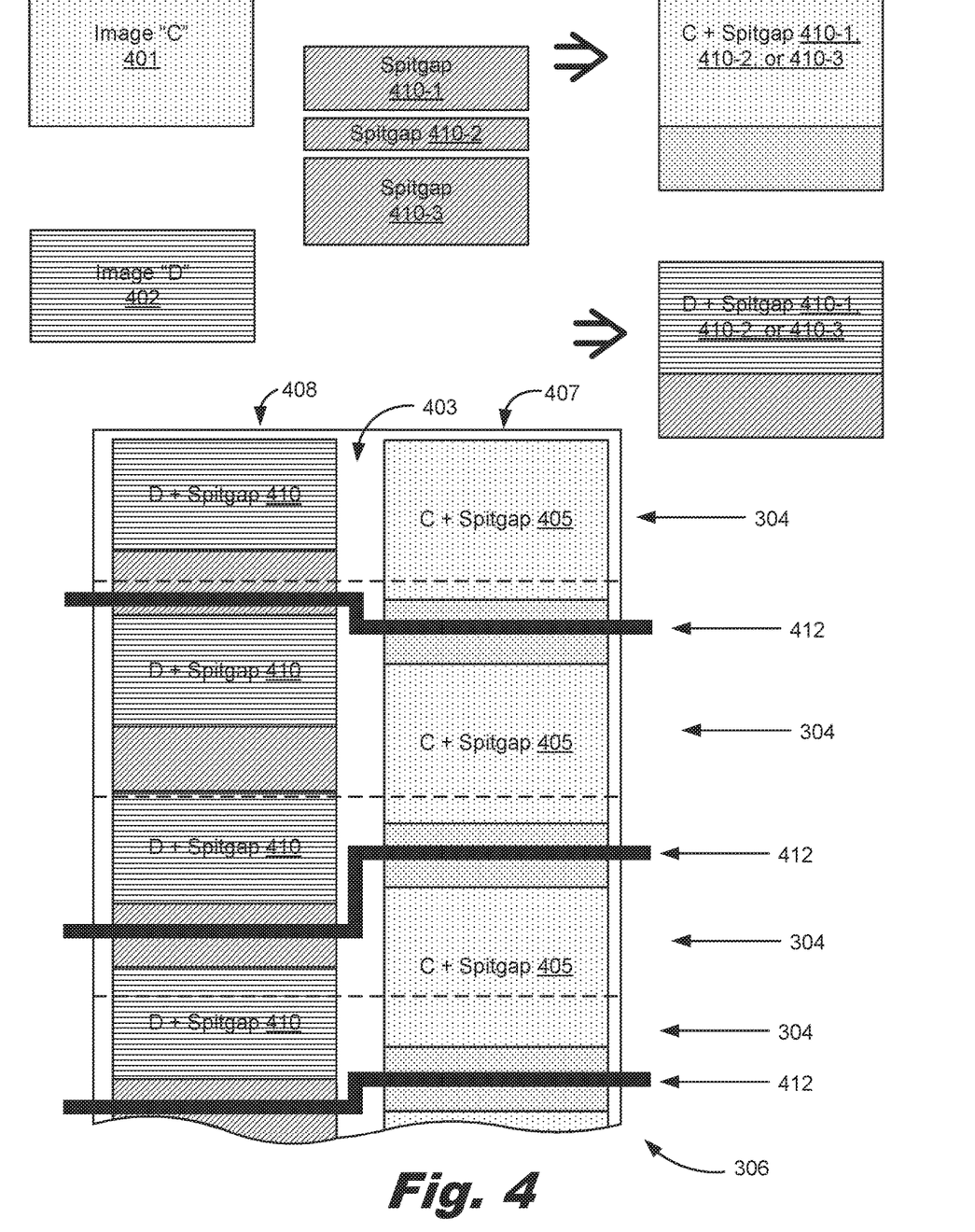
FIG. 4 is a block diagram showing a print layout on a second side of a medium according to an example of the principles described herein.

FIG. 4 is a block diagram showing a print layout on a second side (403) of a medium (306) according to an example of the principles described herein. As described herein, the second side (403) of the medium (306) may receive a second plurality of independent print streams (407, 408) that include independent images (401, 402). In this example, a third image is referred to as Image "C" (401) and a fourth image is referred to as Image "D" (402). Although, Image "A" (301), Image "B" (302), Image "C" (401), and Image "D" (402) may all be different images, in an example, some of the images may be the same so as to produce an image on one side (i.e., Image "A" (301) on a first side (303)) of the medium (306) that is the same as the image on another side (i.e., Image "C" on a second side (403)). In this example, the printed unit that includes Image "A" (301) and Image "C" (401) may be a single printed job according to a print request while the unit that includes Image "B" (302) and Image "D" (402) may be a single printed job according to a print request.

During printing of an image on the second side (403), a sensor associated with a second print engine of the printing device (FIG. 1, 100) may determine to what extent the medium (306) has expanded or shrank. This determination may be based on the distance between marks (FIG. 3, 311) on the first side (303) of the medium (306).

With the determination as to the distance between marks (FIG. 3, 311) on the first side (303), the processor (FIG. 1, 105) may address the placement of Image "C" (401), Image "D" (402), or both Image "C" (401) and Image "0" (402) on the second side (403) of the medium (306). By example, as shown in FIG. 4, a plurality of emulated spitgaps (410-1, 410-2, 410-3) may be determined and used to appropriately position the images (401, 402) on the second side (403) of the medium (306). Because the first side (303) of the medium (306) included images (301, 302) that had associated emulated spitgaps (305, 310) that, when printed on the first side (303) resulted in a white space (area (312)) between the images (301, 302) presented on a single frame, this white space may be used to adjust the position of Image "C" (401) and Image "D" (402) and their respective emulated spitgaps (410-1, 410-2, 410-3) on the second side (403) of the medium (306). This area (412) created by the emulated spitgaps (410-1, 410-2, 410-3) may, therefore, be adjusted on the second side (403) of the medium (306) in order to compensate for physical distortions of the medium (306) between the print engines. This emulation of the print streams (407, 408) using the variable emulated spitgaps (410-1, 410-2, 410-3) may be done during a stitching operation of the print streams (407, 408) on the second side (403).

In this example, the error in position along the length of the second side (403) of the medium (306) may be consistently directed to zero by, in real time, adjusting which of the emulated spitgaps (410-1, 410-2, 410-3) should be associated with both Image "C" (401) and Image "D" (402) in any individual gapless frame (304). Such an adjustment may be done along any print stream (407, 408) formed on the second side (403) of the medium (306) and within a single frame (304). Although, FIG. 4 shows three different sizes of emulated spitgaps (410-1, 410-2, 410-3) associated with Image "C" (401) and Image "D" (402), this is meant merely as an example and the number of emulated spitgaps (410-1, 410-2, 410-3) associated with either Image "C" (401) or Image "D" (402) may be more or less than that shown. In the examples presented herein, the of emulated spitgaps (410-1, 410-2, 410-3) associated with Image "C" (401) and Image "D" (402) are the same within a single frame (304). Other emulated spitgaps (410-1, 410-2, 410-3) associated with Image "C" (401) and Image "D" (402) for other frames may be different and also selected based on the measure distortion of the medium (306).

As described herein, the generated emulated spitgaps (410-1, 410-2, 410-3) may be generated in real-time during a printing process or may be generated by the processor (FIG. 1, 105) prior to initiating the print job. The generation of the various emulated spitgaps (410-1, 410-2, 410-3) may include implementing compressed file formats that provide random access of regular area and tessellation and portable network graphics.

Figure 5:
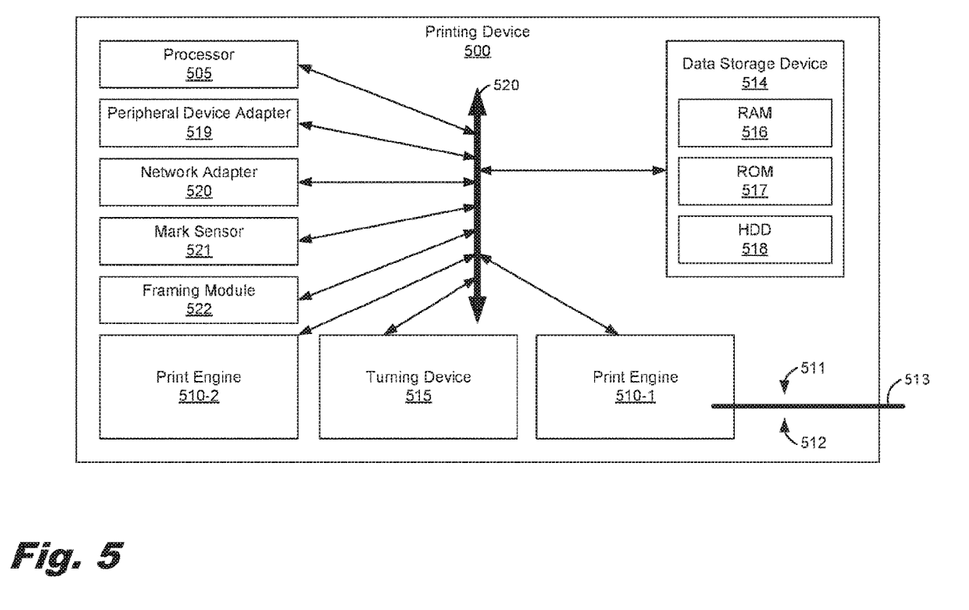
FIG. 5 is a block diagram of a printing device according to an example of the principles described herein.

FIG. 5 is a block diagram of a printing device (500) according to an example of the principles described herein. The printing device (500) may include a processor (505) that performs the computations and methods as described herein. The printing device (500) may further include a plurality of print engines (510-1, 510-2) that each apply a printing fluid onto a first (511) and second (512) side of a medium (513). A turning device (515) may be placed in between the print engines (510-1, 510-2) to flip the medium (513) from the first side (511) to the second side (512).

The printing device (500) may further include a mark sensor (521) to sense the marks placed on the first side (511) of the medium (513) as described herein. The mark sensor (521) may be included at the second print engine (510-2) so as to sense the marks (FIG. 3, 311) on the first side (511) of the medium (513) as the medium (513) is moved into the second print engine (510-2).

To achieve its desired functionality, the printing device (500) may include various hardware components. Among these hardware components may be a number of data storage devices (514), a number of peripheral device adapters (519), and a number of network adapters (520). These hardware components may be interconnected through the use of a number of busses and/or network connections. In one example, the processor (505), data storage device (514), peripheral device adapters (519), first print engine (510-1), second print engine (510-2), turning device (515), and network adapter (520) may be communicatively coupled via a bus (520).

The processor (505) may include the hardware architecture to retrieve executable code from the data storage device (514) and execute the executable code. The executable code may, when executed by the processor (505), cause the processor (505) to implement at least the functionality of receiving data describing a plurality of independent print streams, each of the images including an emulated spitgap; emulating a first frame-less press using gapless frames on a first side of a medium for each of the plurality of independent print streams; and emulating a second frame-less press using gapless frames on a second side of the medium, the emulated spitgap of each of the independent print streams being geometrically adjusted to match a position on the medium of an image on the first side of the medium for each of the plurality of the independent print streams, according to the methods of the present specification described herein. In the course of executing code, the processor (101) may receive input from and provide output to a number of the remaining hardware units.

The data storage device (514) may store data such as executable program code that is executed by the processor (505) or other processing device. The data storage device (514) may specifically store computer code representing a number of applications that the processor (505) executes to implement at least the functionality described herein. The data storage device (514) may include various types of memory modules, including volatile and nonvolatile memory. For example, the data storage device (514) of the present example includes Random Access Memory (RAM) (516), Read Only Memory (ROM) (517), and Hard Disk Drive (HDD) memory (518). Many other types of memory may also be utilized, and the present specification contemplates the use of many varying type(s) of memory in the data storage device (514) as may suit a particular application of the principles described herein. In certain examples, different types of memory in the data storage device (514) may be used for different data storage uses. For example, in certain examples the processor (505) may boot from Read Only Memory (ROM) (517), maintain nonvolatile storage in the Hard Disk Drive (HDD) memory (518), and execute program code stored in Random Access Memory (RAM) (516).

The data storage device (514) may comprise a computer readable medium, a computer readable storage medium, or a non-transitory computer readable medium, among others. For example, the data storage device (514) may be, but not limited to, an electronic, magnetic, optical, electromagnetic, infrared, or semiconductor system, apparatus, or device, or any suitable combination of the foregoing, More specific examples of the computer readable storage medium may include, for example, the following: an electrical connection having a number of wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain or store a program for use by or in connection with an instruction execution system, apparatus, or device.

The hardware adapters (519, 520) in the printing device (500) enable the processor (505) to interface with various other hardware elements, external and internal to the printing device (500), For example, the peripheral device adapters (519) may provide an interface to input/output devices, such as, for example, display device, a mouse, or a keyboard. The peripheral device adapters (519) may also provide access to other external devices such as an external storage device, a number of network devices such as, for example, servers, switches, and routers, client devices, other types of computing devices, and combinations thereof.

The printing device (500) further includes a framing module (522), The framing module (522) within the printing device (500) includes executable program code that may be executed separately. In this example, the framing module (522) may be stored as separate computer program product as other modules or executable code associated with the printing device (500). In another example, the framing module (522) within the printing device (500) may be combined within a number of computer program products; each computer program product comprising a number of the modules. In an example, the framing module (522) may be formed into an application specific integrated circuit (ASIC) that is communicatively coupled to the bus (520) and allowed to communicate to the processor (505).

The printing device (500) may be utilized in any data processing scenario including, stand-alone hardware, mobile applications, through a computing network, or combinations thereof. Further, the printing device (500) may be used in a computing network, a public cloud network, a private cloud network, a hybrid cloud network, other forms of networks, or combinations thereof. In one example, the methods provided by the printing device (500) are provided as a service over a network by, for example, a third party. In this example, the service may comprise, for example, the following: a Software as a Service (SaaS) hosting a number of applications; a Platform as a Service (PaaS) hosting a computing platform comprising, for example, operating systems, hardware, and storage, among others; an Infrastructure as a Service (IaaS) hosting equipment such as, for example, servers, storage components, network, and components; among others; application program interface (API) as a service (APIaaS), other forms of network services, or combinations thereof. The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the printing device (500) are executed by a local administrator.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general-purpose computer, special purpose computer, or other programmable data processing apparatus to produce a machine, such that the computer usable program code, when executed via, for example, the processor (505) of the printing device (500) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe the use of emulated spitgaps with independent print streams. The emulated spitgaps may be used in a frameless emulation of a print stream such that multiple print streams may be printed on both sides of a single medium. This may be referred to as duplex multi-lane print architecture. The present method and systems allow for duplex printing and compensates for the expansion and shrinkage of the medium between application of printing fluid on a first side of the medium and then a second side of the medium. The system and method allow for duplex printing on a single roll of medium where the two print engines involved have the same or different frame size.

The preceding description has been presented to illustrate and describe examples of the principles described. This description is not intended to be exhaustive or to limit these principles to any precise form disclosed. Many modifications and variations are possible in light of the above teaching.

What is claimed is:

1. A printing device, comprising:
a processor to:
receive data describing a plurality of independent print streams comprising an image;
for each of the plurality of independent print streams, emulate a first frame-less press using gapless frames on a first side of a medium upon execution of a framing module wherein each of the images of the independent print streams comprise an emulated spitgap;
for each of the plurality of independent print streams, emulating a second frame-less press using gapless frames on a second side of the medium with the framing module, wherein an emulated spitgap associated with each of the images of the second side of the medium is to be geometrically adjusted to match a position on the medium of an image on the first side of the medium.

2. The printing device of claim 1, wherein the processor causes a number of marks to be printed on the medium to indicate a position of each of the gapless frames on the first side of the medium.

3. The printing device of claim 2, wherein the marks are scanned to determine a starting position of the gapless frames and wherein the emulated spitgap of each of the images of the plurality of print streams on the second side of the medium are adjusted based on the marks.

4. The printing device of claim 1, comprising two print engines separated by a web turning system.

5. The printing device of claim 1, wherein the images of the plurality of print streams are geometrically independent based on one of a pixel width, a pixel length, or combinations thereof of the images.

6. The printing device of claim 1, wherein the emulated spitgap associated with each of the images on the first side is geometrically different.

7. The printing device of claim 1, wherein the difference in the emulated spitgap associated with each of the images on the first side of the medium is accounted for in determining the adjustment of the emulated spitgap of each of the images on the second side of the medium.

8. A method, comprising:
with a processor:
receiving data describing a plurality of independent print streams comprising an image;
for each of the plurality of independent print streams, emulating a first frame-less press using gapless frames on a first side of a medium wherein each of the images of the independent print streams comprise an emulated spitgap;
for each of the plurality of independent print streams, emulating a second frame-less press using gapless frames on a second side of the medium, wherein an emulated spitgap associated with each of the images on the second side of the medium is to be geometrically adjusted to match a position on the medium of an image on the first side of the medium;
wherein the geometrical adjustment provided by the emulated spitgap for the second frameless press compensates for a distortion of the size of the medium.

9. The method of claim 8, wherein the processor causes a number of top-of-form marks to be printed on the medium to indicate a position of each of the gapless frames on the first side of the medium.

10. The method of claim 8, wherein the top-of-form marks are scanned to determine a starting position of the gapless frames and wherein the emulated spitgap of each of the images of the second side of the medium are adjusted based on the top-of-form marks.

11. The method of claim 8, wherein the images of the plurality of print streams are geometrically independent based on one of a pixel width, a pixel length, or combinations thereof of the images.

12. The method of claim 8, wherein the emulated spitgap associated with each of the images on the first side is geometrically different.

13. A computer program product for duplex multi-lane printing, the computer program product comprising:
- a non-transitory computer readable storage medium comprising computer usable program code embodied therewith, the computer usable program code to, when executed by a processor:
  - receive data describing a plurality of independent print streams comprising an image;
  - for each of the plurality of independent print streams, emulating a first frame-less press using gapless frames on a first side of a medium with each of the plurality of images of the independent print streams comprising an emulated spitgap;
  - for each of the plurality of independent print streams, emulating a second frame-less press using gapless frames on a second side of the medium, wherein an emulated spitgap associated with each of the images of the second side of the medium is to be geometrically adjusted to match a position on the medium of an image on the first side of the medium.

14. The computer program product of claim 13, wherein the processor causes a number of top-of-form marks to be printed on the medium to indicate a position of each of the gapless frames on the first side of the medium.

15. The computer program product of claim 14, wherein the top-of-form marks are scanned to determine a starting position of the gapless frames and wherein the emulated spitgap of each of the images of the second side of the medium are adjusted based on the top-of-form marks.

* * * * *